United States Patent
Kawai et al.

(10) Patent No.: US 10,821,540 B2
(45) Date of Patent: Nov. 3, 2020

(54) SEAM WELDING APPARATUS, SEAM WELDING METHOD, ROBOT CONTROL DEVICE, AND ROBOT CONTROL METHOD

(71) Applicants: KABUSHIKI KAISHA YASKAWA DENKI, Kitakyushu (JP); HONDA MOTOR CO., LTD., Tokyo (JP)

(72) Inventors: Yasuhiro Kawai, Tochigi (JP); Kazuhiko Yamaashi, Tochigi (JP); Haruhiko Kobayashi, Tochigi (JP); Mitsugu Kaneko, Tochigi (JP); Noriko Kurimoto, Tochigi (JP); Masami Nakakura, Fukuoka (JP); Teppei Sonoda, Fukuoka (JP)

(73) Assignees: KABUSHIKI KAISHA YASKAWA DENKI, Kitakyushu (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/741,465

(22) Filed: Jun. 17, 2015

(65) Prior Publication Data
US 2015/0283644 A1 Oct. 8, 2015

Related U.S. Application Data

(63) Continuation of application No. PCT/JP2013/083908, filed on Dec. 18, 2013.

(30) Foreign Application Priority Data

Dec. 18, 2012 (JP) .................................. 2012-275804

(51) Int. Cl.
*B23K 11/06* (2006.01)
*B23K 11/25* (2006.01)
(Continued)

(52) U.S. Cl.
CPC ............ *B23K 11/067* (2013.01); *B23K 11/24* (2013.01); *B23K 11/253* (2013.01);
(Continued)

(58) Field of Classification Search
CPC ..... B23K 11/067; B23K 11/24; B23K 11/252; B23K 11/255; B23K 11/3036; B23K 11/314; B23K 11/36; B23K 11/06
(Continued)

(56) References Cited

U.S. PATENT DOCUMENTS 4,144,440 A * 3/1979 Schalch ............... B23K 11/253
219/111
4,732,026 A * 3/1988 Ban .................... B21D 51/2676
219/64

(Continued)

FOREIGN PATENT DOCUMENTS

| JP | 2005-052878 A | 3/2005 |
|---|---|---|
| JP | 2006-205171 | 8/2006 |

(Continued)

OTHER PUBLICATIONS

English translation of the Written Opinion for corresponding International Application No. PCT/JP2013/083908, dated Mar. 25, 2014.
(Continued)

*Primary Examiner* — Justin C Dodson
(74) *Attorney, Agent, or Firm* — Mori & Ward, LLP

(57) ABSTRACT

The seam welding apparatus includes a pair of rotating electrodes, an electrode supporting frame, a distance measuring means, and a controller. The electrode supporting frame supports the pair of rotating electrodes. The distance measuring means is provided on the electrode supporting frame and measures a distance to an edge of the steel plate. The controller controls the robot to adjust a running direction of the rotating electrodes so that a deviation comes into
(Continued)

zero when a distance actually measured by the distance measuring means deviates from a predetermined distance. Thereby, it is accomplished that the seam welding apparatus is downsized as well as uninfluenced by the surface state and/or shape of workpiece (steel plate).

11 Claims, 15 Drawing Sheets

(51) Int. Cl.
| | |
|---|---|
| *B25J 9/16* | (2006.01) |
| *B23K 11/36* | (2006.01) |
| *B23K 11/30* | (2006.01) |
| *B23K 11/24* | (2006.01) |
| *B23K 11/31* | (2006.01) |
| *B23K 101/00* | (2006.01) |
| *B23K 101/04* | (2006.01) |
| *B23K 103/04* | (2006.01) |

(52) U.S. Cl.
CPC ........ *B23K 11/3036* (2013.01); *B23K 11/314* (2013.01); *B23K 11/36* (2013.01); *B25J 9/1697* (2013.01); *B23K 2101/006* (2018.08); *B23K 2101/04* (2018.08); *B23K 2103/04* (2018.08); *G05B 2219/37423* (2013.01); *G05B 2219/40613* (2013.01); *G05B 2219/45104* (2013.01); *Y10S 901/42* (2013.01)

(58) Field of Classification Search
USPC ... 219/82, 78.01, 81, 84, 86.1, 86.24, 86.33, 219/86.41, 88
See application file for complete search history.

(56) References Cited

U.S. PATENT DOCUMENTS

| | | | |
|---|---|---|---|
| 6,023,044 A | 2/2000 | Kosaka et al. | |
| 6,321,139 B1* | 11/2001 | Terada ................... | B25J 9/1697 219/124.34 |
| 8,431,858 B2 | 4/2013 | Kanaya et al. | |
| 2009/0179021 A1* | 7/2009 | Nishimura ........... | B23K 9/1272 219/136 |
| 2009/0279096 A1* | 11/2009 | Lim ....................... | G01N 21/55 356/446 |
| 2010/0170879 A1* | 7/2010 | Kanaya ................ | B23K 11/067 219/104 |
| 2010/0270271 A1* | 10/2010 | Jacob .................... | B23K 11/25 219/86.25 |
| 2011/0155711 A1* | 6/2011 | Doyle ................... | B23K 9/0956 219/137 R |
| 2011/0163074 A1* | 7/2011 | Kaga ..................... | B23K 11/04 219/83 |
| 2011/0233173 A1* | 9/2011 | Kaneko ................ | B23K 11/002 219/83 |
| 2012/0000891 A1* | 1/2012 | Nakanishi ............. | B23K 11/115 219/86.7 |

FOREIGN PATENT DOCUMENTS

| | | |
|---|---|---|
| JP | 2007-167896 A | 7/2007 |
| JP | 2010-158692 A | 7/2010 |

OTHER PUBLICATIONS

International Search Report for corresponding International Application No. PCT/JP2013/083908, dated Mar. 25, 2014.
Written Opinion for corresponding International Application No. PCT/JP2013/083908, dated Mar. 25, 2014.
Partial Supplementary European Search Report for corresponding EP Application No. 13864352.3—1702, dated Jul. 19, 2016.
Extended European Search Report for corresponding EP Application No. 13864352.3—1702, dated Nov. 15, 2016.
Canadian Office Action for corresponding CA Application No. 2,895,478, dated May 10, 2017.
Chinese Office Action for corresponding CN Application No. 201380065272.3, dated Apr. 12, 2017.
Japanese Office Action for corresponding JP Application No. 2014-553181, dated Aug. 8, 2017 (w/ English machine translation).
Chinese Office Action for corresponding CN Application No. 201380065272.3, dated Feb. 23, 2018.
Indonesian Office Action for corresponding ID Application No. P00201503610, dated Apr. 24, 2018.
Chinese Office Action for corresponding CN Application No. 201611103639.8, dated Aug. 10, 2018.
Chinese Office Action for corresponding CN Application No. 201380065272.3, dated Sep. 19, 2018.
Canadian Office Action for corresponding CA Application No. 2,895,478, dated May 3, 2018.
Canadian Office Action for corresponding CA Application No. 2,895,478, dated Apr. 15, 2019.
Indian Office Action for corresponding in Application No. 3459/CHENP/2015, dated Apr. 29, 2019.
Chinese Office Action for corresponding CN Application No. 201611103639, dated Mar. 25, 2019.
Chinese Office Action for corresponding CN Application No. 201611103639.8, dated Sep. 29, 2019.
Notification of Reexamination for corresponding CN Application No. 201380065272.3, dated Sep. 6, 2019.
Canadian Office Action for corresponding CA Application No. 2,895,478, dated Aug. 27, 2020.

\* cited by examiner

SEAM WELDING APPARATUS, SEAM WELDING METHOD, ROBOT CONTROL DEVICE, AND ROBOT CONTROL METHOD

CROSS-REFERENCE TO RELATED APPLICATION

This application is a continuation of International Application No. PCT/JP2013/083908, filed on Dec. 18, 2013 which claims the benefit of priority from the Japanese Patent Application No. 2012-275804, filed on Dec. 18, 2012, the entire contents of which are incorporated herein by reference.

FIELD

The present invention is related to a seam welding apparatus, a seam welding method, a robot control device, and a robot control method, which are suitable for seam welding, in particular, seam welding for vehicle bodies.

BACKGROUND

A seam welding method using rotating electrodes is well known. In the well-known art, two-layered steel plates are sandwiched with a pair of rotating electrodes, one of which is powered and the other of which is grounded. A weld metal (nugget) results in between the two steel plates. A weld metal is formed in a linearly sequential manner by relatively moving the rotation electrodes.

Because the seam welding is consecutive welding, it is suitable for a tank in which seal-ability is required. In case of a 3-dimensional workpiece, it is likely to happen that the rotating electrodes are detached from the workpiece. Therefore, a measure to prevent the detachment is required. A seam welding apparatus taking a measure to prevent the detachment of the rotating electrodes has been proposed in various ways (for example, see Japanese Laid-open Patent Publication No. 2010-158692(JP2010-158692A)).

JP2010-158692A discloses a seam welding apparatus comprising a substrate fixed to a base, a body rotatably supported to the base, a rotation mechanism to revolute the body, a pair of rotating electrodes, a load cell to measure a load applied to the rotating electrode in a direction perpendicular to a feeding direction of the workpiece (i.e., an object to be welded). The rotation mechanism causes the rotating electrodes to rotate around a vertical line passing through the pair of rotating electrodes. The rotation mechanism causes the rotating electrodes to rotate around the vertical line such that a value of the load measured by the load cell comes equal to zero.

The seam welding apparatus disclosed in JP2010-158692A comprises a base, a body, a rotation mechanism and rotating electrodes. Accordingly, the footprint of the apparatus is significantly large. In light of needs for a low cost of the seam welding apparatus, it is desirable to provide a down-sized seam welding apparatus.

The seam welding apparatus disclosed in JP2010-158692A prevents a detachment of the rotating electrodes by rotating the rotating electrodes around the vertical line such that a value of the load measured by the load cell comes equal to zero. The more complex a shape of the workpiece is, the more likely a value of the load measured by the load cell fluctuates. As a result of fluctuation of the value of the load, it leads to frequent rotation of the rotating electrodes around the vertical line. Frequent rotation of the rotating electrodes causes the seam to be meandered more likely. It is desirable to provide a good seam without meandering regardless the shape of the workpiece.

SUMMARY

A seam welding apparatus according to an aspect of embodiments performs seam welding on layered steel palates, the seam welding apparatus includes: an articulated robot capable of setting a predetermined tolerance for a joint; and a welding device attached to the robot. The welding device includes: a pair of rotating electrodes; an electrode supporting frame that supports the rotating electrodes; a distance measuring means provided on the electrode supporting frame, the distance measuring means being configured to measure a distance to an edge of the steel plate; and a controller configured to control the robot to adjust a running direction of the rotating electrodes so that a deviation comes into zero when a distance actually measured by the distance measuring means deviates from a predetermined distance.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Some exemplary embodiments are preferably described below with reference to the accompanying drawings.

Figure 1:
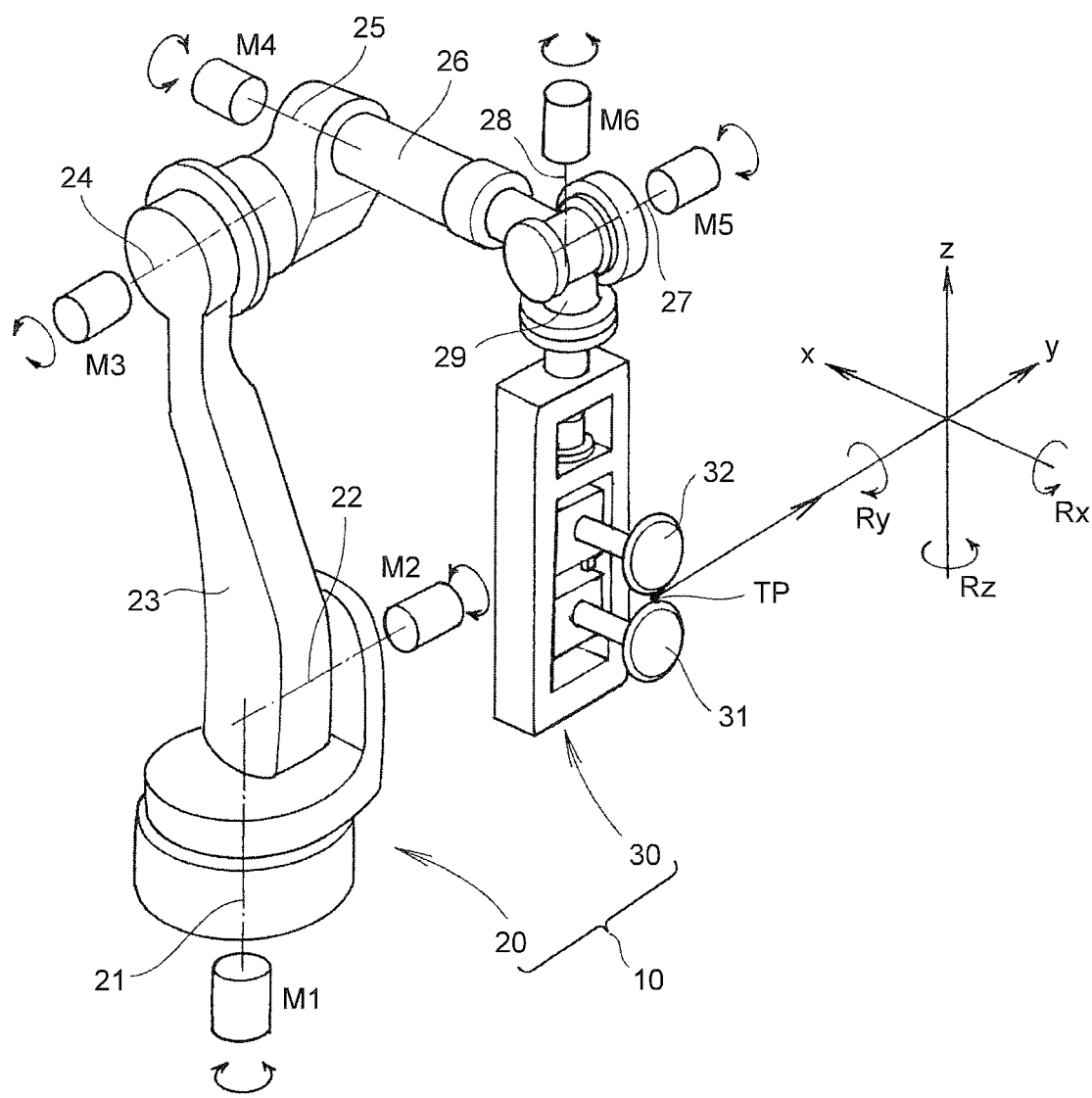
FIG. 1 is perspective view of a seam welding apparatus according to the present invention.

As shown in FIG. 1, a seam welding apparatus 10 includes an articulated robot 20 and a welding device 30 attached to the articulated robot 20.

For example, the articulated robot 20 is a robot having six axes includes: a lower arm part 23 that is revolved with a first motor M1 (although the motor is actually incorporated into the apparatus, the motor is depicted out of the apparatus in FIG. 1. The same shall apply another motor hereafter.) about a first axis 21 corresponding to an axis perpendicular to the surface of the ground while being swung with a second motor M2 about a second axis 22 corresponding to a horizontal axis; an upper arm part 26 connected to a tip of the lower arm part 23 via a third axis 24 that is swung with a third motor M3 about the third axis 24 while being revolved with a fourth motor M4 about a fourth axis 25 perpendicular to the third axis 24; and a wrist part 29 connected to a tip of the upper arm part 26 via a fifth axis 27 that is swung with a fifth motor M5 about the fifth axis 27 while being revolved with a sixth motor M6 about a sixth axis 28 perpendicular to the fifth axis 27.

A teaching point TP between a pair of rotating electrodes 31 and 32 has positional information (including rotation position) defined by x-axis, y-axis and z-axis, which are orthogonal coordinate axes, as well as Rx-axis, Ry-axis and Rz-axis, which are rotational coordinate axes to prescribe posture of the robot 20.

Figure 2A:
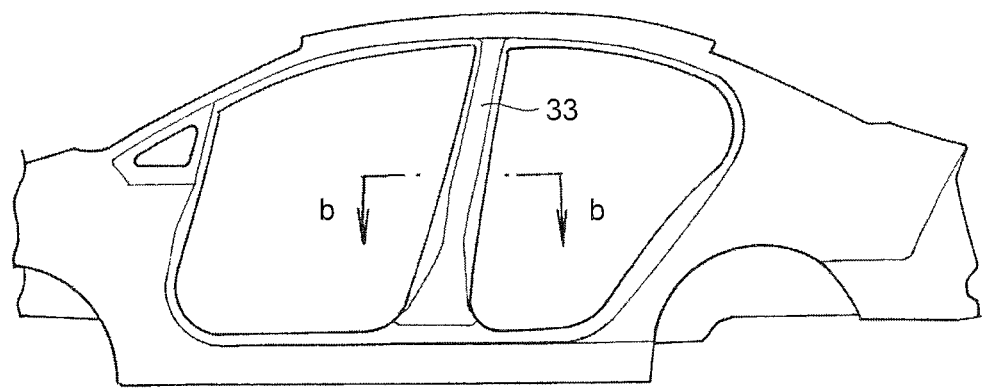
FIGS. 2A and 2B are an exemplary diagram of an object to be welded.
Figure 2B:
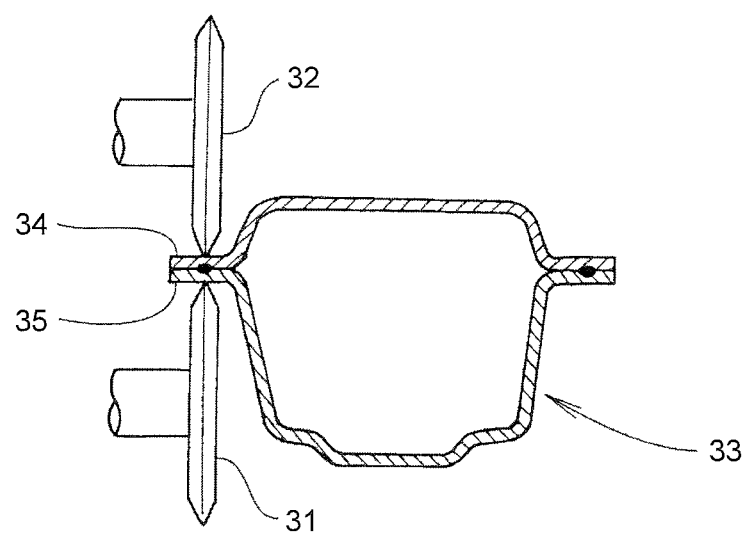

As shown in FIG. 2A, the seam welding apparatus 10 is employed to weld the vehicle body, for example. As shown in FIG. 2B that is cross-sectional view taken by a line b-b of FIG. 2A, it is employed to weld a flange 34 and a flange 35 that are an inner member and an outer member of a center pillar 33, respectively.

Figure 3:
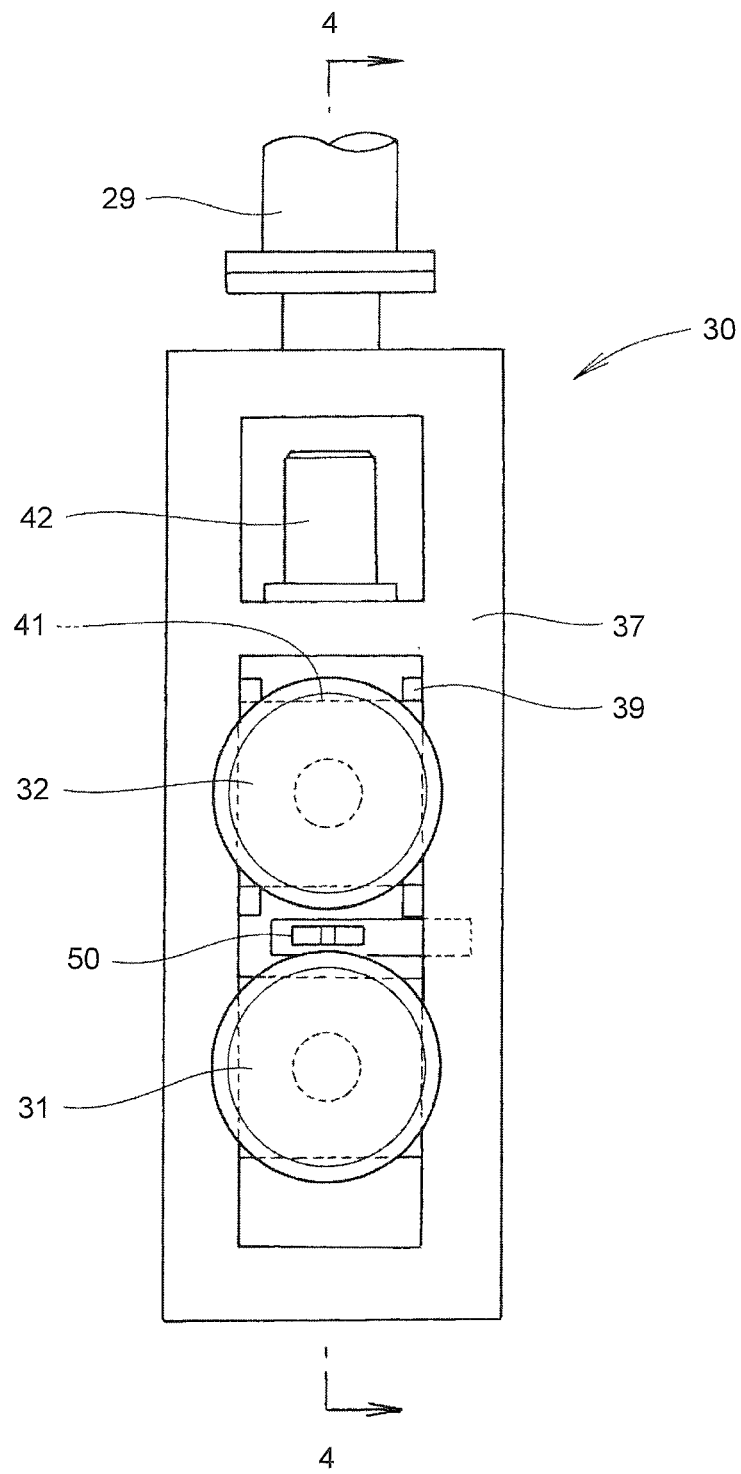
FIG. 3 is a front view of a welding apparatus.

As shown in FIG. 3, the welding device 30 includes a pair of rotating electrodes 31 and 32, an electrode supporting frame 37 to support the rotating electrodes 31 and 32, and a distance measuring means 50 to measure a distance to the edges of the flanges.

One of the rotating electrodes 32 is slidably adapted with a rail 39, a slider 41 and a cylinder 42. If a thickness of the flanges varies, one of the rotating electrodes 32 moves.

Figure 4:
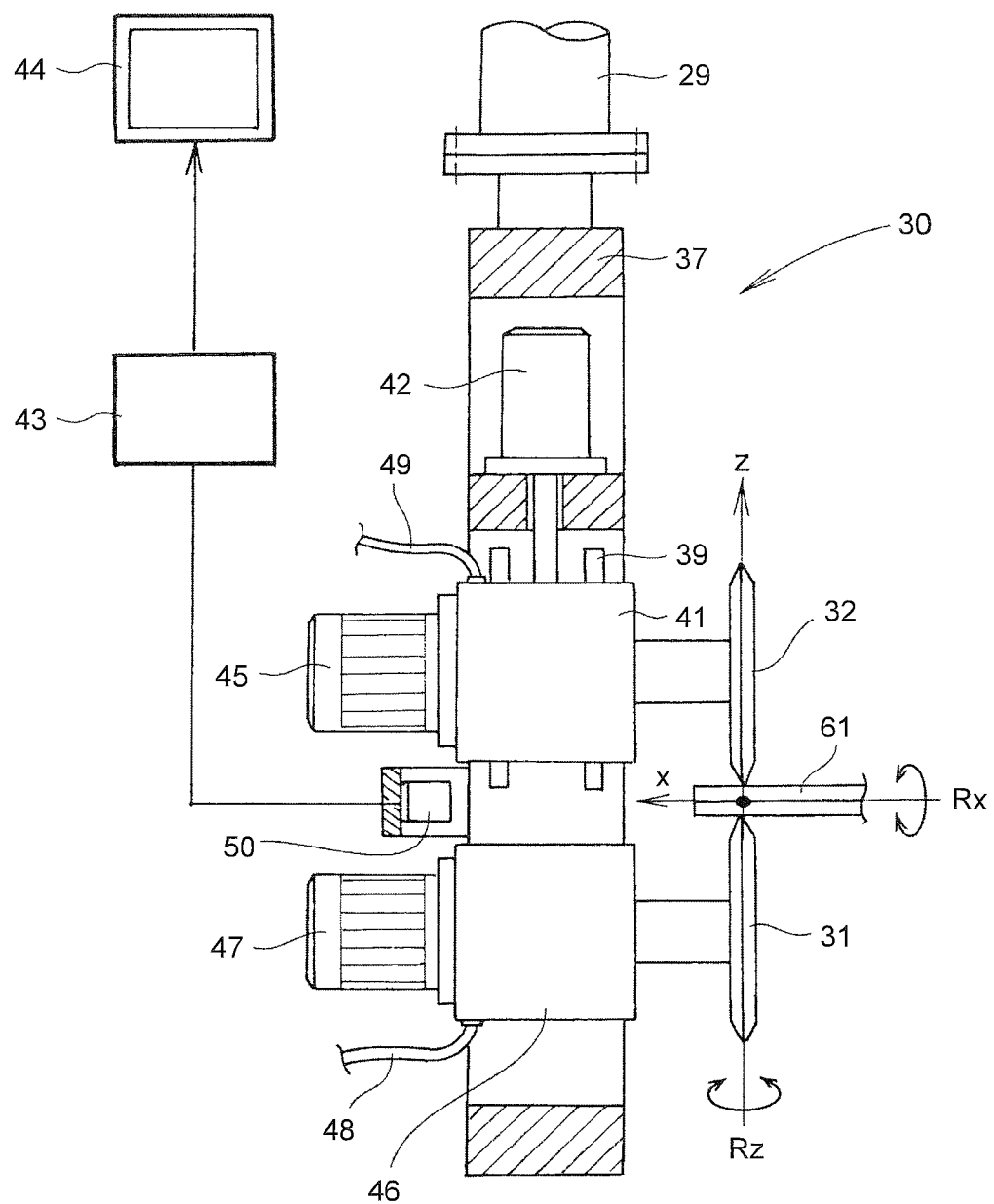
FIG. 4 is a sectional view taken along a line 4-4 of FIG. 3.

As shown in FIG. 4, distance information is sent from the distance measuring means 50. A controller 43 controls an articulated robot (in FIG. 1, generally denoted as reference numeral 20). A motor 45 attached to the slider 41 rotates one of the rotating electrodes 32, and a motor 47 attached to a supporting block 46 rotates the other rotating electrode 31. Welding current is supplied to the rotating electrode 31 through a power source side cable 48, and then passes through a ground side cable 49 that is electrically connected to the rotating electrode 32. The power source side cable and the ground side cable may be reversible.

Figure 5:
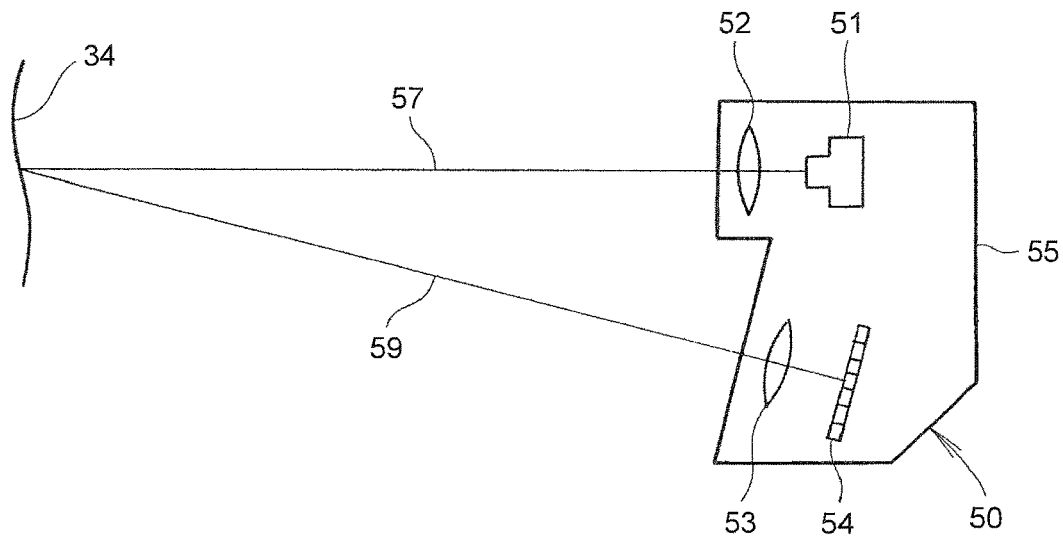
FIG. 5 is a schematic diagram illustrating an operational principal of a distance measuring means.

As shown in FIG. 5, the distance measuring means 50 includes a laser emission part 51 to irradiate an emitted light 57, a light projecting lens 52 to focus the emitted light 57, a light receiving lens 53 to focus a reflected light 59, a light position detecting device 54 to identify a light receiving position of the reflected light 59, and a casing 55 to enclose these elements entirely.

Figure 6A:
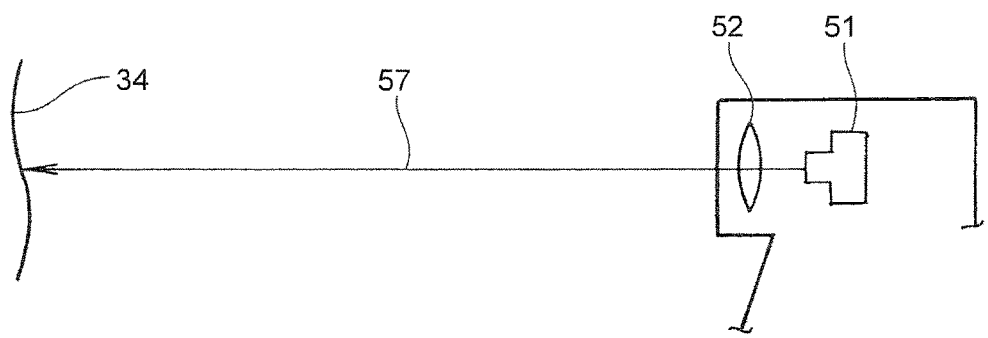
FIGS. 6A and 6B are a schematic diagram illustrating a diffused reflection light.

As shown in FIG. 6A, the emitted light 57 irradiated at the laser emission part 51 passes through the light projecting lens 52 and then reaches at the edge of the flange 34.

The edge of the flange 34 come into a diffused reflection plane because light is diffusely reflected at a plane except for a mirror plane.

Figure 6B:
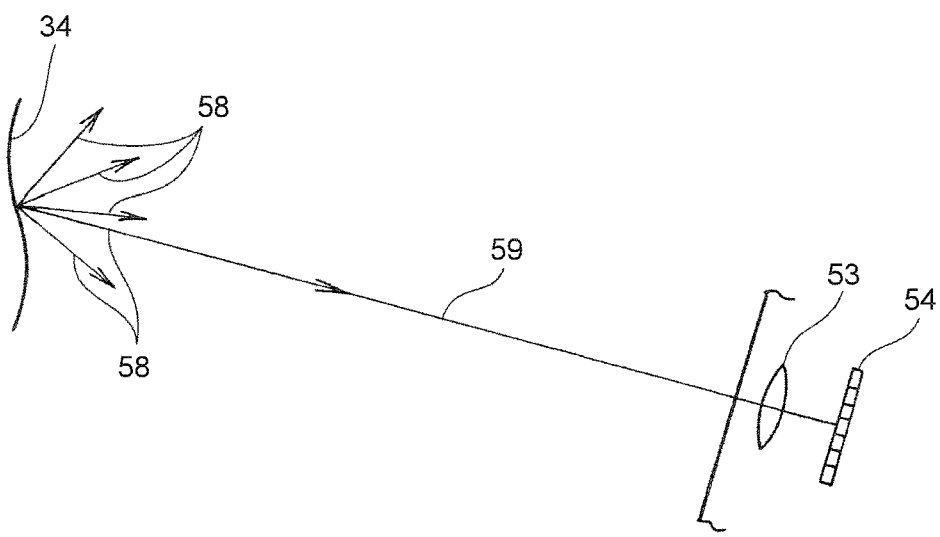

As shown in FIG. 6B, a diffused reflection light 58 is generated at that point. A reflected light 59 as a part of the diffused reflection light 58 reaches the light receiving lens 53 to be focused with the light receiving lens 53 and then illuminates a light position detecting device 54. Hereinafter, it should be noted that among numerous diffused reflection light 58, only the light directed to the light receiving lens 53 is referred to as a reflected light 59.

Figure 7:
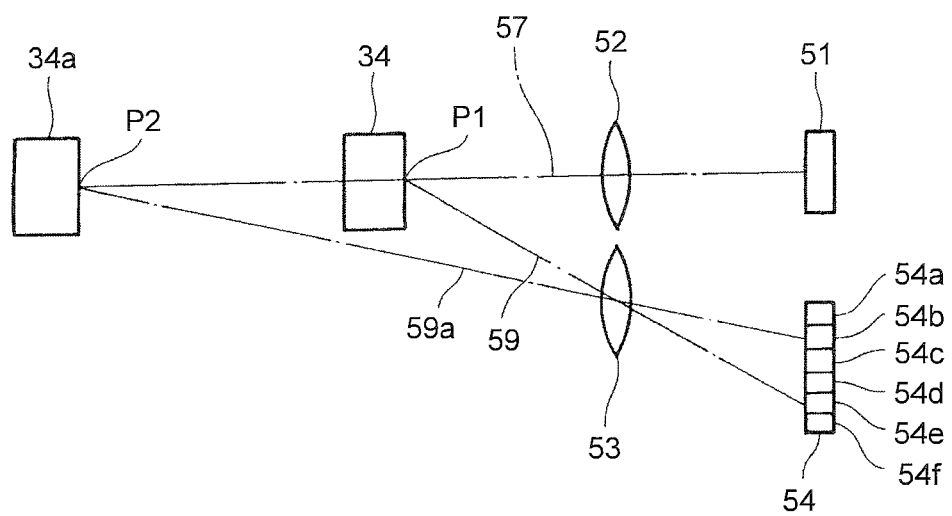
FIG. 7 is a schematic diagram illustrating operation of the distance measuring means.

As shown in FIG. 7, the light position detecting device 54 is provided with many (for the purpose of illustration, six) light receiving devices 54a to 54f.

In such a case that the flange 34 is in vicinity of the light projecting lens 52, the reflected light 59 proceeds on a path line connecting between a point P1 where the emitted light 57 illuminates and a center of the light receiving lens 53 and then is received by the fifth device 54e.

In FIG. 7, for the purpose of easy understanding, distally located flange is denoted as reference numeral 34a and a reflected light is denoted as a reference numeral 59a. As shown in FIG. 7, in such a case that the flange 34 is distally located from the light projecting lens 52, the reflected light 59 proceeds on a path line connecting between a point P2 where the emitted light 57 illuminates and a center of the light receiving lens 53 and then is received by the second device 54b.

Relative position obtained from among positions of the laser emission part 51, the light projecting lens 52, the light receiving lens 53 and the light position detecting device 54 are fixed and each position coordinate thereof is known. Therefore, if it can be found that which of light receiving devices 54a to 54f receives the reflected light, it is possible to obtain the geometric position of the flange 34.

Now, operation of the above mentioned seam welding apparatus 10 is described below. Hereinafter, the flange 34 is generally referred to as a steel plate 61.

Furthermore, in FIGS. 8A to 9C, for the purpose of illustration, only rotating electrode 32 is illustrated to describe the operation. However, as shown in FIG. 4, a pair of rotating electrodes 31 and 32 rotates in the same direction about an Rz axis by the same amount of rotation at the same time.

Figure 8A:
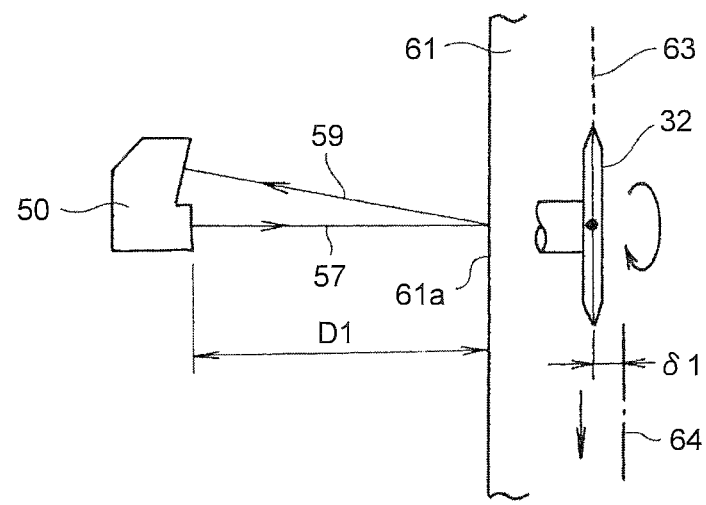
FIGS. 8A and 8B are a schematic diagram illustrating operation of the seam welding apparatus.
Figure 8A:
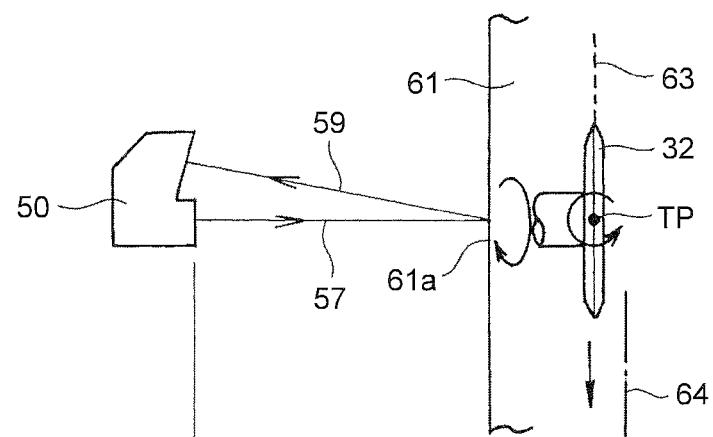

As shown in FIG. 8A, a steel plate 61 is relatively static and the rotating electrode 32 relatively moves downward in the drawing. The distance measuring means 50 also moves together with the rotating electrode 32 downward in the drawing. It is assumed that a seam line (electric resistance weld line) 63 displaces toward an edge 61 by $\delta 1$ from an estimated line 64 that corresponds to a welding line. An actual distance D1 between edges 61a measured by the distance measuring means 50 leads to a distance longer than the predetermined distance by $\delta 1$.

Figure 8B:
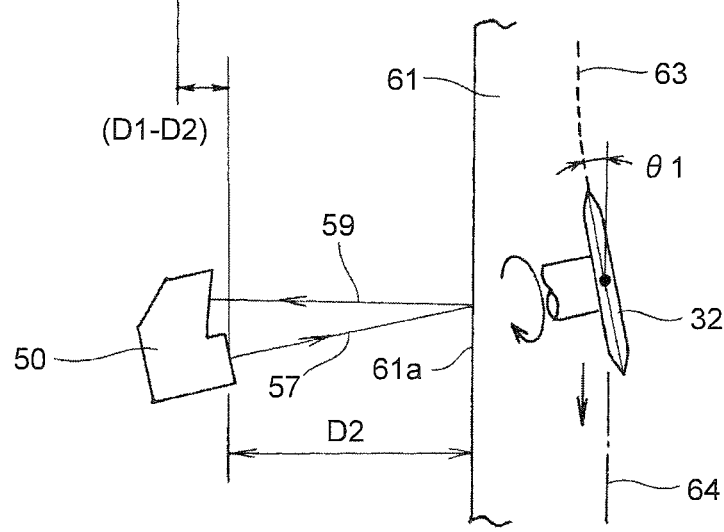

The controller (see FIG. 4, reference numeral 43) causes the rotating electrode 32 to rotate in order to reduce $\delta 1$ as shown in FIG. 8B. Then, as shown in FIG. 8B, the seam line 63 bends by a revolving angle $\theta 1$. By means of the bend, an actual distance D2 between edges 61a measured by the distance measuring means 50 decreases (i.e., D2>D1).

Figure 9A:
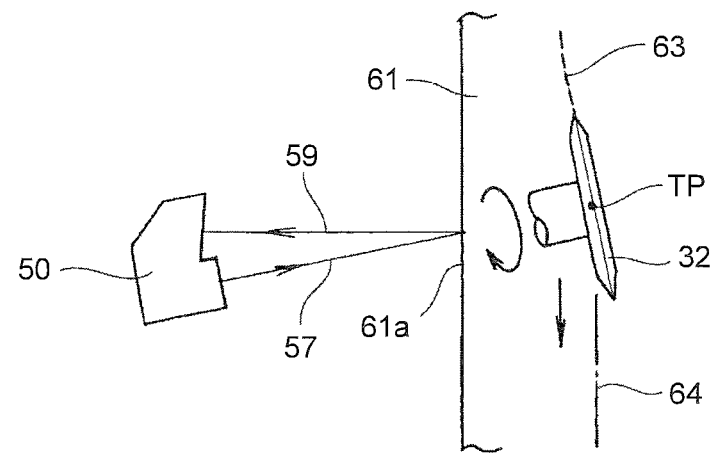
FIGS. 9A to 9C are a schematic diagram illustrating operation of the seam welding apparatus.
Figure 9B:
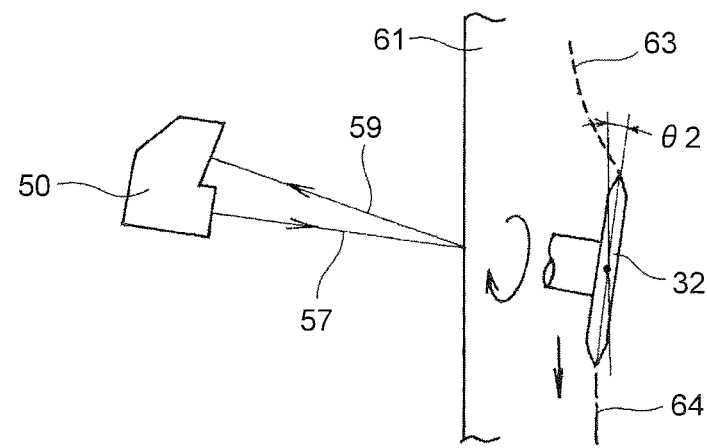
Figure 9C:
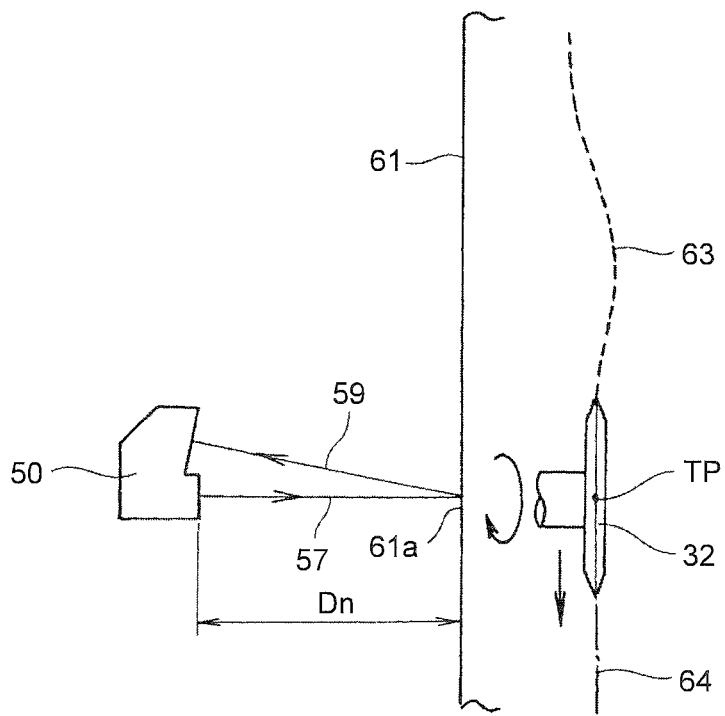

As shown in FIG. 9A, in such a case that the point TP is across an estimated line 64, the rotating electrode 32 is reversely rotated. As shown in FIG. 9B, by means of a revolving angle $\theta 2$, a seam line 63 curves. Then, as shown in FIG. 9C, the point PT meets the estimated line 64.

Namely, actual measuring of a distance to the edge 61a is always performed (actually measured) by the distance measuring means 50. If the actual distance Dn is distinct from the predetermined distance, the revolving angles $\theta 1$ and $\theta 2$ are controlled such that a deviation $\delta 1$ comes equal to zero. Preferably, the control is performed with PID control.

FIGS. 8A to 9C are described again based on a control flow.

Figure 10:
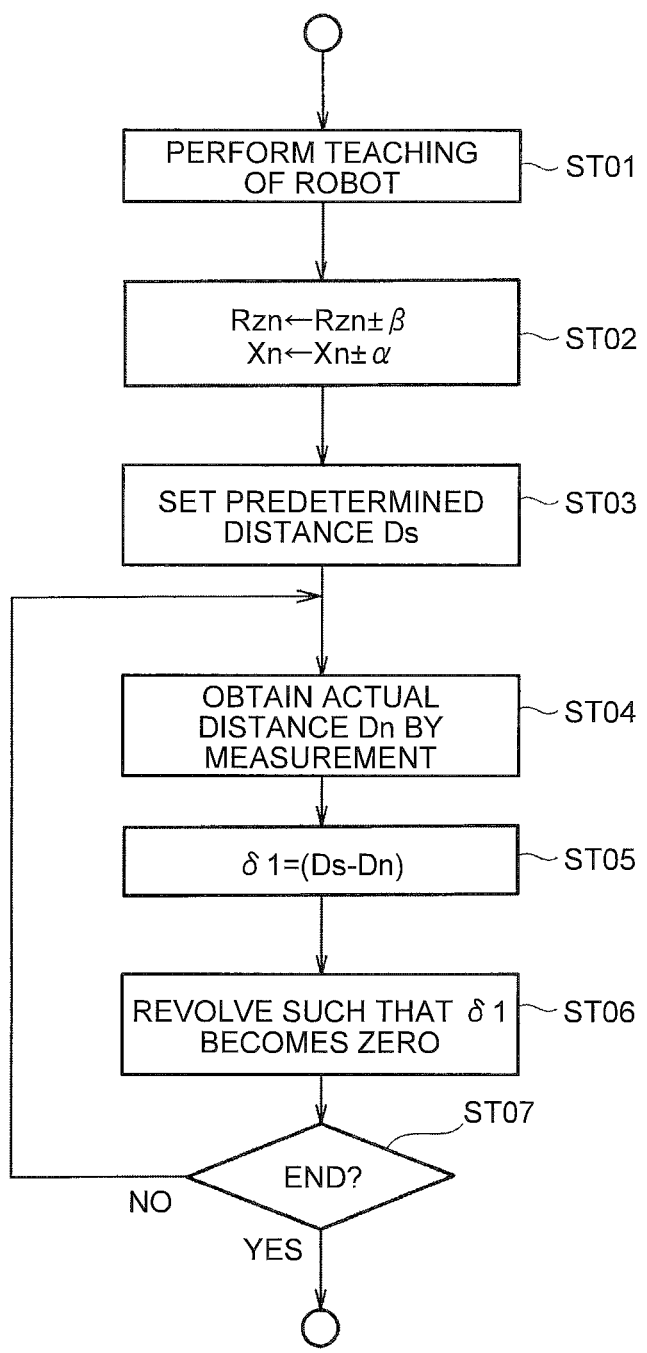
FIG. 10 is a flowchart illustrating flow of controlling of the seam welding apparatus.

As shown in FIG. 10, at step number (hereinafter, simply referred to as ST) 01, a teaching of a robot is performed. Subsequently, at ST02, tolerance β is provided to Rzn in order to allow the rotation electrode to rotate about Rzn axis, and thus tolerance α is provided to xn because movement in a direction of an x axis is caused accompanying with the rotation of the rotation electrode.

Subsequently, a given distance Ds from the distance measuring means 50 to the edge of the steel plate 61a is set (ST03). Then, the distance measuring means 50 actually measures a distance to the edge of the steel plate 61a (ST04).

The controller 43 performs a calculation to obtain a deviation δ1 on the basis of a formula δ1=(Ds−Dn) (ST05).

The controller 43 determines a direction in which the value of δ1 comes equal to zero and causes the rotating electrode 32 to rotate in the direction. Decreasing the value of deviation 51 results in reduction of a revolving angle (ST06).

At ST07, steps from ST04 to ST06 are repeated until instruction of termination is provided in order to sequentially measure the distance and always revolute the rotation electrodes such that the distance comes into the predetermined distance, and thereby causing the seam line 63 to be proximate to the predetermined line.

A method of the present invention includes the steps of: teaching to teach a welding line to an articulated robot (ST01); setting to set a tolerance to joint of the articulated robot (ST02); setting the predetermined distance to the controller (ST03); measuring a distance to the edge of the steel plate with the distance measuring means upon seam welding (ST04); calculating with the controller a deviation between actually measured distance and the predetermined distance (ST05); and controlling the revolving means with the controller such that the value of the deviation comes equal to zero and adjusting a running direction of the rotation electrodes (ST06).

According to the present invention, it is accomplished that the edge of the steel plate follows the seam line 63 by relatively moving the welding device to the steel plate with the articulated robot in line with the teaching to adjust a running direction of the rotation electrode within a range of tolerance of joints.

As mentioned above referring to FIGS. 2A to 3, the distance measuring means 50 is placed in a vicinity of the rotating electrodes 31 and 32. In such a case that the distance measuring means 50 is an optical measuring device, it might be affected by a welding spark light. In that case, an alternative embodiment as described below is preferable.

Figure 11A:
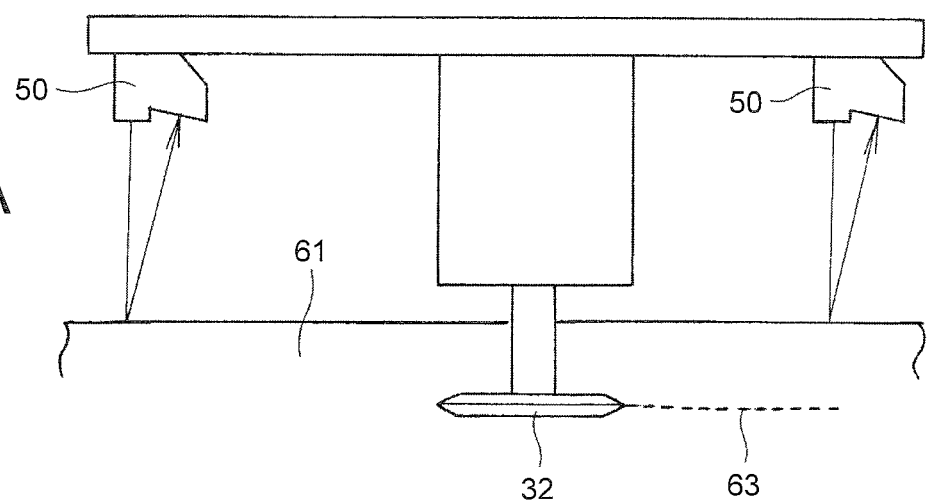
FIGS. 11A to 11C are a schematic diagram showing alternative arrangement of the distance measuring means.

As shown FIG. 11A, the distance measuring means 50 are located back and forth the rotating electrode 32 apart from each other with some distance.

Specifically, in an example shown in FIG. 11A, the distance measuring means 50 are located back and forth the rotating electrode 32 apart from each other with the same distance. The controller 43 may estimate average value of distance information that is obtained by each of the distance measuring means 50 as a distance to edge 61a at a position corresponding to the rotating electrode 32. Furthermore, in FIG. 11A, the distance measuring means 50 are located back and forth the rotating electrode 32 one by one. However, the present invention is not limited thereto. For example, one of distance measuring means 50 may be located back and forth the rotating electrode 32.

Figure 11B:
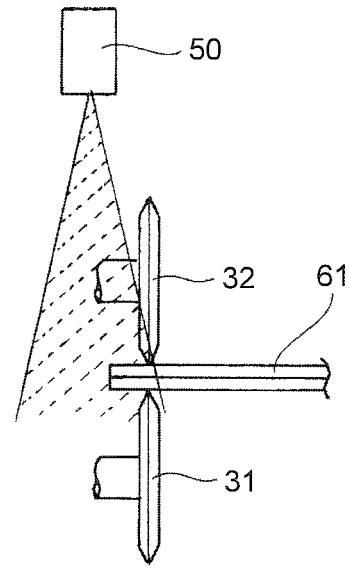

Alternatively, as shown in FIG. 11B, the distance measuring means 50 may be mounted above the rotating electrode 32. Because welding spark light is emitted horizontally, it is efficient to prevent the distance measuring means from the welding spark light. Preferably, the distance measuring means 50 is an image sensor capable of recognizing the edge of the steel plate from the image data and operating the position of the edge.

Figure 11C:
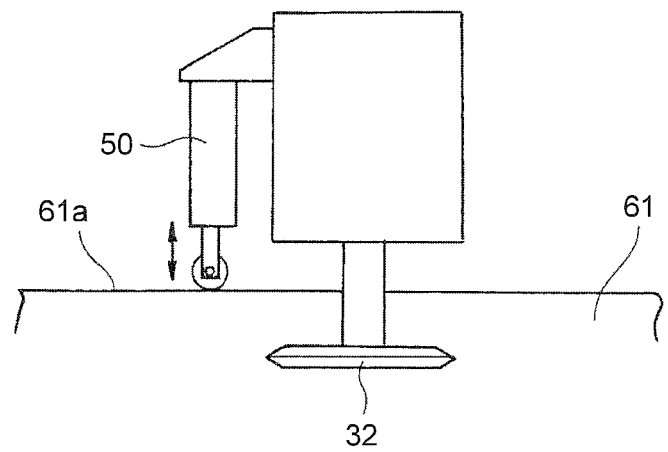

In another embodiment as shown in FIG. 11C, a mechanical distance measuring means 50 may be employed that is not affected by any light.

Specifically, in embodiment as shown in FIG. 11C, the controller 43 stores the distance information obtained from the mechanical distance measuring means 50 in time sequence, and stores in advance a spaced apart distance between the position of the edge 61a measured by the mechanical distance measuring means 50 and the position of the edge 61a corresponding to the rotating electrode 32. If the rotating electrode 32 proceeds by the spaced apart distance, the controller 43 may estimate distance to the current edge 61a at the rotating electrode 32 based on the distance information of the mechanical distance measuring means 50 stored at the time prior to proceeding by the spaced apart distance.

Next, alternative embodiments as illustrated in FIGS. 2A to 3 are described below.

Figure 12:
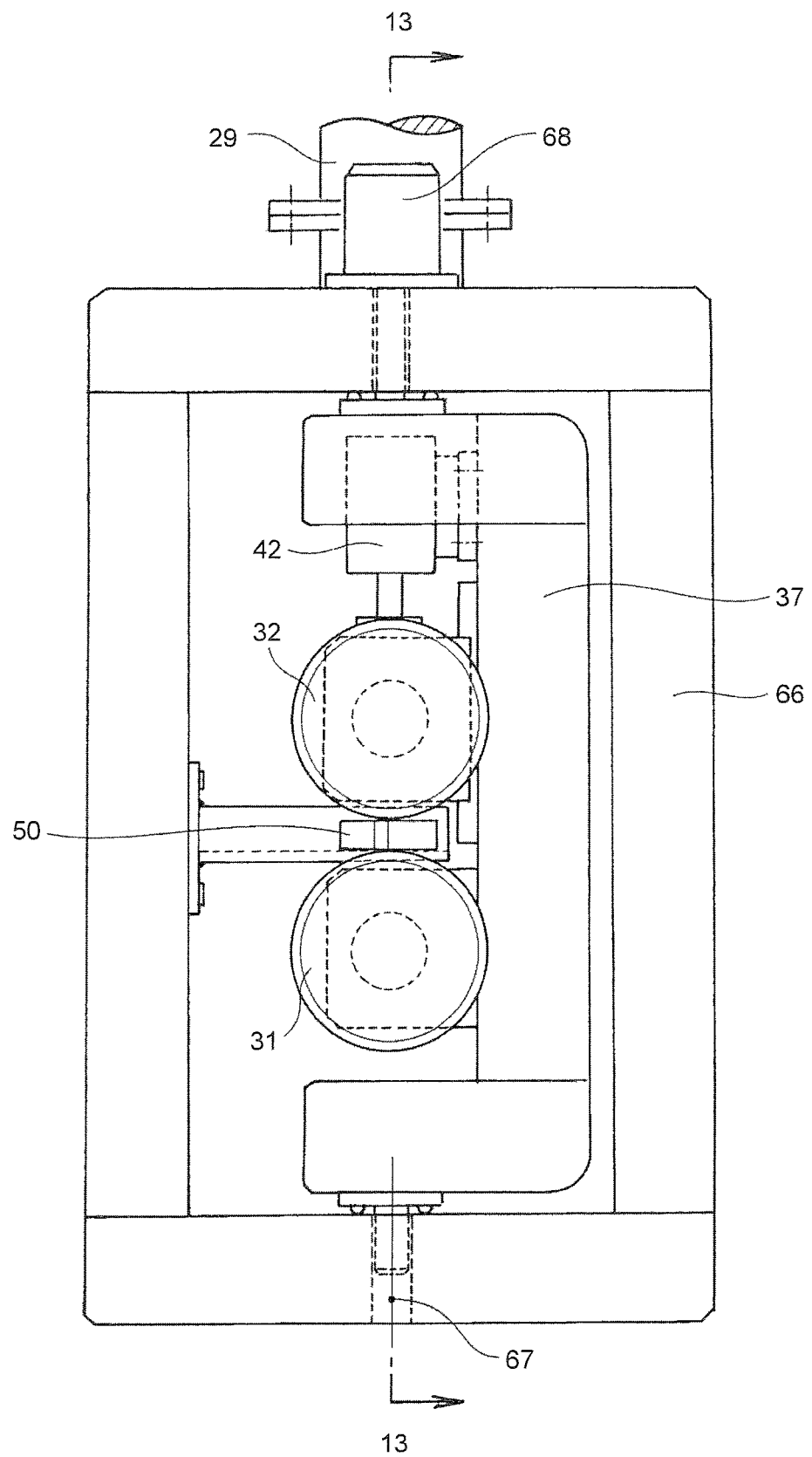
FIG. 12 is a schematic diagram showing a modified example of the seam apparatus.

As shown in FIG. 12, the robot (wrist part 29) is provided with a support frame 66. The electrode supporting frame 37 is adapted to the support frame 66 in a manner rotatable around a vertical axis 67. The rotating electrodes 31 and 32 are adapted to the electrode supporting frame 37. The support frame 66 is provided with a revolving means 68. The electrode supporting frame 37 may be revolved by the revolving means 68. Elements identical to elements shown in FIGS. 2A to 3 are denoted by like reference numerals and explanations are omitted. As the revolving means 68, servomotor with a decelerator is preferable.

Figure 13:
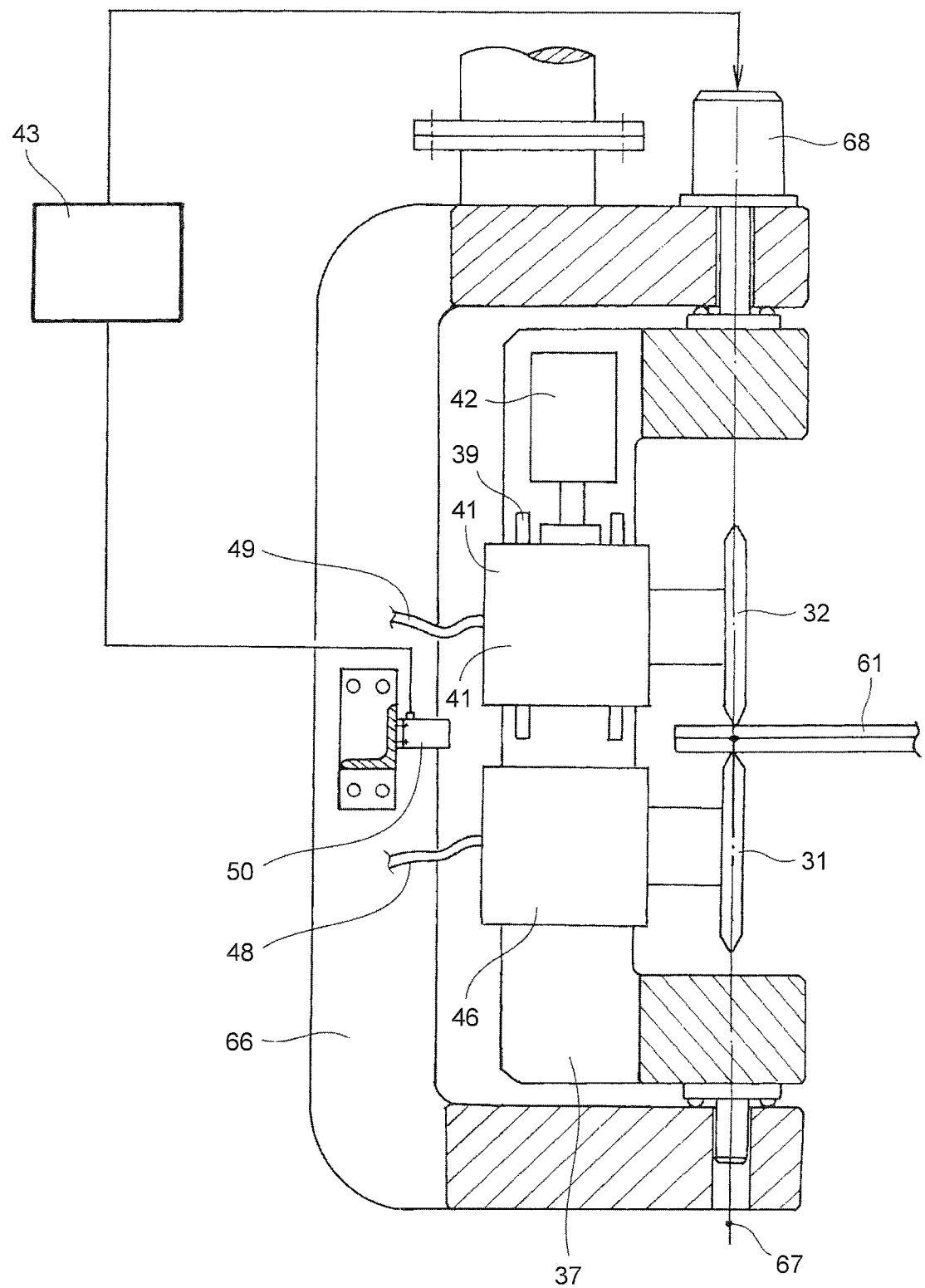
FIG. 13 is a cross-sectional view taken by a line 13-13 of FIG. 12.

As shown in FIG. 13, vertical axis 67 passes through centers of the rotating electrodes 31 and 32. The distance measuring means 50 is provided at the support frame 66. Alternatively the distance measuring means 50 may be provided at the electrode supporting frame 37. The controller 43 appropriately operates the revolving means 68 upon receiving the distance information from the distance measuring means 50 to revolve the rotating electrodes 31 and 32 around the vertical axis 67.

As a result that revolving of the rotating electrodes 31 and 32 are controlled by the controller provided within the welding device 30, a load of the robot comes to be reduced. Consequently, it is possible to utilize an inexpensive robot having a less number of axes than six.

The present invention is preferable to a seam welding apparatus to perform a seam welding to a vehicle frame. However, objects to be welded are not limited thereto, for example, may be general constructions which are so called can products.

As mentioned above (see FIG. 1), the seam welding apparatus 10 includes the articulated robot 20 (hereinafter, simply referred to as "robot 20"). The welding device 30 is attached to the wrist part 29 of the robot 20 as an end effector. Hereinafter, the welding device 30 is also referred to as end effector 30.

The end effector 30 is configured to perform a predetermined process, specifically a seam welding process to the steel plate 61a. Hereinafter, the steel prate 61 to be processed may be referred to as "object 61."

It is a case where the end effector 30 is not located at a predetermined target position due to for example a shape of the object 61 when performing the process to the object 61. Specifically, if the object 61 has a concavo-convex shape, and/or predicted trajectory (for instance, the estimated line 64) is curved, it is often the case the end effector 30 is not located at the target position, in other words, the end effector 30 is displaced with respect to the target position.

Therefore, it has been desired to control an operation of the robot 20 so as to bring the end effector 30 having been displaced with respect to the target position back to the target position.

Thus, even if the end effector 30 deviates from the target position, a robot control device according to the present embodiment controls an operation of the robot so as to bring it back to the target position appropriately. Detail explanation of the robot control device is described below.

Figure 14:
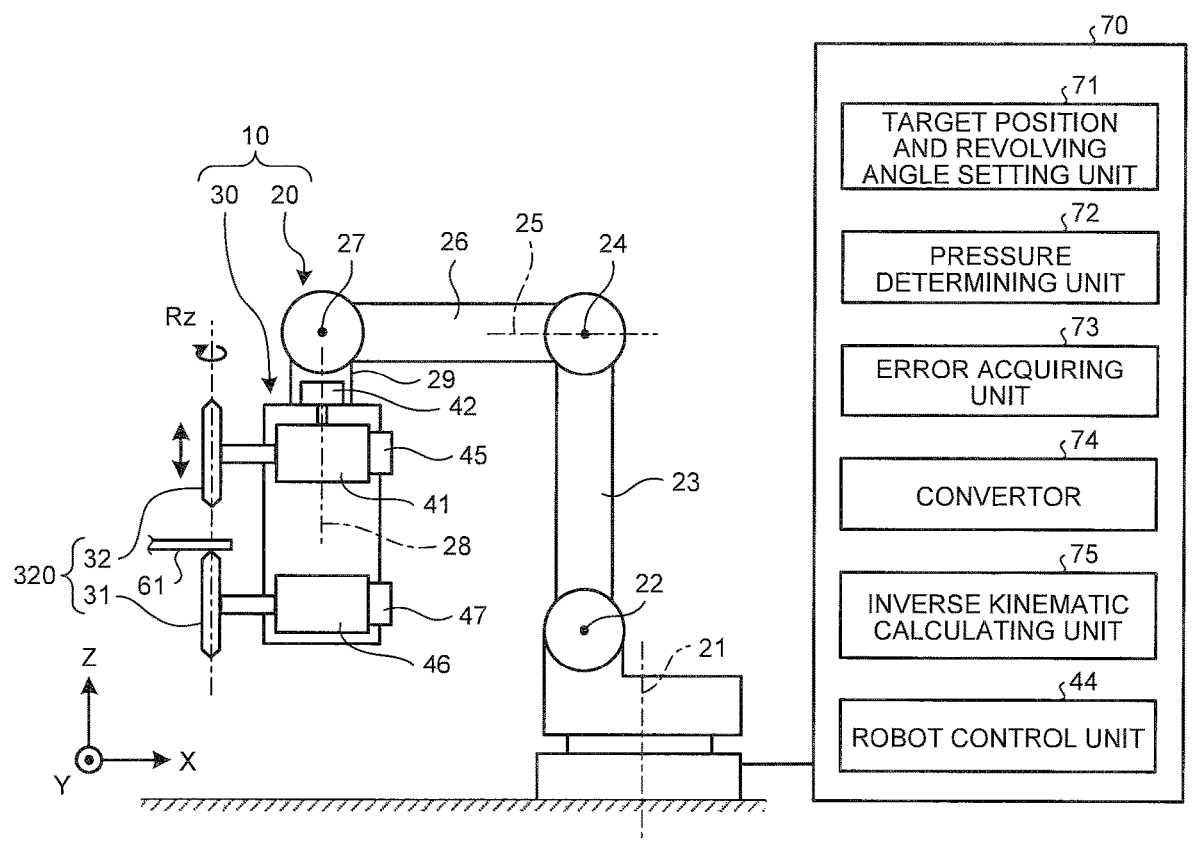
FIG. 14 is a schematic diagram primarily illustrating a robot and a robot control device according to an embodiment.

FIG. 14 is a schematic diagram primarily illustrating a robot 20 and a robot control device according to the embodiment. In FIG. 14, three-dimension orthogonal coordinate system including a z-axis in which vertically upward direction is defined as a positive direction and vertically downward direction is defined as a negative direction, an x-axis being represented as a right and left direction on the surface of the drawing, and a y-axis being represented as a direction that extends from behind to front side of the surface of the drawing. The orthogonal coordinate system is similarly shown in FIGS. 15A to 15C as mentioned below.

In the specification, representations as "x-axis", "y-axis" and "z-axis" means x-axis, y-axis and z-axis, respectively when the robot 20 and the rotating electrode 32 are located in the illustrated positions. They are not limited to directions as being expressed.

As mentioned above, the robot 20 includes a plurality of drive sections (specifically, the first motor M1 to the sixth motor M6, not shown in FIG. 14). The drive sections M1 to M6 cause the joints corresponding to the drive sections to be rotated around the first axis 21 to the sixth axis 28, respectively.

The welding device 30 which is an end effector 30 includes a pair of rotating electrodes 31 and 32 for the seam welding and the like. As mentioned above, the rotating electrodes 31 and 32 move while the rotating electrodes 31 and 32 are rotated by the motors 45 and 47 in contact with each other with sandwiching the object 61 therebetween.

The cylinder 42 causes the rotating electrode 32 being one of a pair of the rotating electrodes 31 and 32 to move downward in FIG. 14 with pressurizing the object 61. The above mentioned cylinder 42 is connected to a cylinder controller (not shown) to control the cylinder 42 for example. Upon receiving instruction of pressurizing, the cylinder controller causes the rotating electrode 32 to move downward such that the object is pressurized with the rotating electrode 32.

As mentioned above, the rotating electrodes 31 and 32 function as a roller part 320 being in contact with the object 61. The end effector 30 moves toward a y-axis direction in the robot coordinate system while being in contact with the object 61 according to rotation of the roller part 320 (rotating electrodes 31, 32). Thereby, when the end effector 30 moves in contact with the object 61 while pressurizing it, it is possible to perform the seam welding to the object 61 by supplying a welding current to the rotating electrodes 31, 32.

On the other hand, the end effector 30 may causes the rotating electrode 32 to release the pressure applied to the object 61 when the seam welding is not performed. Namely, the object 61 is brought into an unpressurized situation. The robot 20 causes the rotating electrode 32 of the end effector 30 to move until next welding position for example in contact with the object 61 while rotating. Movement of the end effector 30 by means of the robot 20 is performed with a position control which is described below for the detail.

In the example described above, the rotating electrode 32 of the end effector 30 comes in contact with the object 61 even if the seam welding is not performed. However, the embodiment is not limited thereto. Namely, when the seam welding is not performed, for example the cylinder 42 may cause the rotating electrode 32 to move upward in FIG. 14 and thus to be apart from the object 61.

As shown in FIG. 14, a robot control device 70 is electrically connected to the robot 20. The robot control device 70 is provided with a storage section such as a CPU (Central Processing Unit), ROM (Read Only Memory), RAM (Random Access Memory) and a hard disk and the like, those are not shown. The CPU of the robot control device 70 reads out a program stored in the storage section to control and drive the robot 20 in accordance with the program.

The robot control device 70 includes a target position and revolving angle setting unit 71, a pressure determining unit 72, an error acquiring unit 73, a converter 74, an inverse kinematics calculating unit 75, and a robot control unit 44.

The target position and revolving angle setting unit 71 sets a target position of the end effector 30 as well as a revolving angle thereof. Specifically, the target position and revolving angle setting unit 71 sets a target position of the rotating electrodes 31 and 32 as well as a revolving angle thereof. More specifically, at robot reaching step, the target position and revolving angle setting unit 71 receives a position instruction value that indicates the target position and the revolving angle of the end effector 30 via a input device (for example, a programming pendant) which is not shown. At the robot reaching step, the position instruction value is input in a robot coordinate system.

The target position and revolving angle setting unit 71 converts the position instruction value to a position instruction value in orthogonal coordinate system using forward kinematics operation. The position instruction value in orthogonal coordinate system is the position instruction value that is set by the target position and revolving angle setting unit 71. In this way, the target position and revolving angle of the end effector 30 is set in advance (teaching) by the target position and revolving angle setting unit 71 prior to performing the seam welding.

Figure 15A:
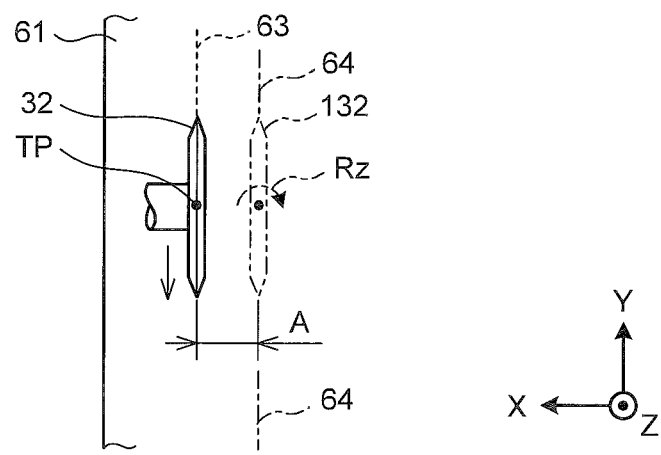
FIGS. 15A to 15C are diagram illustrating control of the robot that is performed by the robot control device.
Figure 15B:
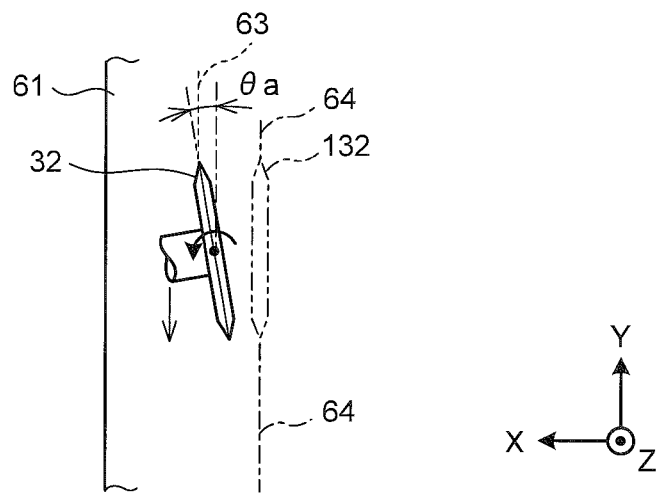
Figure 15C:
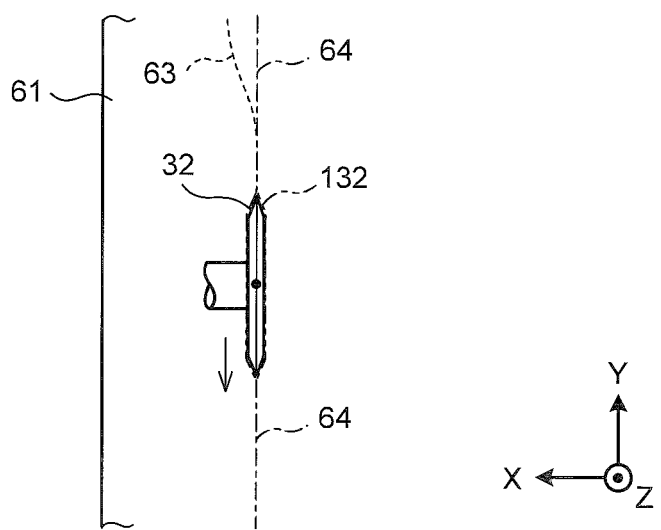

Specifically, the above mentioned target position and the like are described in detail referring to FIGS. 15A to 15C. FIGS. 15A to 15C are description view of a control performed by the robot control device 70. FIGS. 15A to 15C illustrate the area near the rotating electrode 32 of the end effector 30 when viewing from the z-axis positive direction similar to FIGS. 8A to 9C. Although in FIGS. 15A to 15C only the rotating electrode 32 is illustrated, a pair of rotating electrodes 31 and 32 are configured to revolve around Rz axis to the same direction by the same or substantially same amount of rotation as mentioned above.

A target position 132 of the rotating electrode 32 of the end effector 30 is shown as double-dashed line. In FIG. 15A, actual position of the rotating electrode 32 is displaced toward x-axis positive direction with respect to the target position 132. A point where the target position 132 of the rotating electrode 32 comes into contact with the object 61 is a welding target point. A line passing those points is the estimated line 64.

The revolving angle of the end effector 30 set by the target position and revolving angle setting unit 71, exactly revolving angle of the rotating electrode 32, is angle defined by a proceeding direction of the rotating electrode 32 (y-axis in robot coordinate system) together with y-axis in orthogonal coordinate system, for example. In an example of FIG. 15A, if the rotating electrode 32 is not displaced with respect to the target position 132, the revolving angle is set as zero because a proceeding direction of the rotating electrode 32 is parallel to y-axis. In the example above, the revolving angle is based on y-axis, it is not limited thereto. The revolving angle may be based on x-axis.

In FIG. 14, the pressure determining unit 72 determines whether the rotating electrodes 31 and 32 pressure the object 61, in other word, whether the rotating electrodes 31 and 32 are ready to perform the seam welding to the object 61.

The pressure determining unit 72 determines whether the rotating electrodes 31 and 32 pressurize the object 61 based on whether pressurizing instruction is or not. In the embodiment above, although the pressure determining unit 72 makes a determination based on whether pressurizing instruction is or not, it is not limited thereto.

For example, the pressure determining unit 72 may make a determination based on outputs from pressure sensors which are adapted to the rotating electrodes 31 and 32.

The error acquiring unit 73 acquires error A between actual position or estimated position of the end effector 30 (for example, actual position of the rotating electrode 32 being shown as solid line in FIG. 15A) and a target position of the end effector 30 (for example, target position of the rotating electrode 32 being shown as double-dashed line).

The error A is the same or substantially the same as the deviation 51 above mentioned. Accordingly, the error acquiring unit 73 is capable of obtaining distance information from the distance measuring means 50 to acquire the error A based on the distance information.

In the embodiment above, although the error acquiring unit 73 acquires the error A based on the distance information from the distance measuring means 50, it is not limited thereto. For example, the error acquiring unit 73 may estimate the position of the rotating electrode 32 based on position sensors such as encoders adapted to drive sections (a first motor M1 to a sixth motor M6) to acquire the error A from the estimated position of the rotating electrode 32 and the target position 132.

The converter 74 converts the error A to correction angle θa for the revolving angle of end effector 30 (exactly, rotating electrode 32) set in advance by the target position and revolving angle setting unit 71 (see FIG. 15B). The converter 74 sets the correction angle θa to a value at which the error A comes close to zero, for example.

Specifically, the converter 74 obtains the correction angle θa using PI (proportional integral) control along with the following formula (1);

$$\theta a = kp(1 + ki/s) \times A \qquad \text{formula (1)}$$

where kp is proportional gain, ki is integral gain, s is Laplace operator.

The inverse kinematics calculating unit 75 corrects a revolving angle (positional instruction value) in orthogonal coordinate system by adding correction angle 9a obtained by the converter 74 to the revolving angle (positional instruction value) in orthogonal coordinate system. Hereinafter, corrected positional instruction value in orthogonal coordinate system is referred as to "corrected instruction value."

The inverse kinematics calculating unit 75 calculates a positional instruction value in robot coordinate system for each of drive sections associated with each of joints of the robot 20. Specifically, the inverse kinematics calculating unit 75 generates operation positional instruction signal for each of the first motor M1 through the sixth motor M6.

Subsequently, the inverse kinematics calculating unit 75 transmits the generated operation position instruction signal to the robot control unit 44. In this way, the inverse kinematics calculating unit 75 corrects with the correction angle θa the revolving angle of the rotating electrode 32 set in advance by the target position and revolving angle setting unit 71.

The robot control unit 44 controls the robot 20 such that the rotating electrode 32 of the end effector 30 revolves based on the correction angle θa. Specifically, the robot control unit 44 controls operation of each of drive sections (the first motor M1 through the sixth motor M6) based on operation position instruction signal transmitted from the inverse kinematics calculating unit 75.

Thereby, revolving of the rotating electrode 32 is made as shown in FIG. 15B. By controlling the robot 20 in the above mentioned way, it allows the rotating electrode 32 to come close to the target position 132 gradually as well as correction angle θa to be operated depending on the error A to decrease gradually. Finally, as shown in FIG. 15C, the rotating electrode 32 moves as far as the rotating electrode 32 meets or substantially meets the target position 132.

Thereby, even if the end effector 30, exactly rotating electrode 32, deviates from the target position 132, the robot control device 70 is capable of controlling an operation of the robot 20 so as to bring it back to the target position 132, appropriately. The transition from the state of rotating electrode 32 as shown in FIG. 15B to the state thereof as shown in FIG. 15C is described above in detail with reference to FIGS. 8A to 9C. Therefore, the description is omitted.

When the rotating electrode 32 does not pressurize the object 61, that is, the seam welding is not performed, the robot control unit 44 controls the robot 20 to perform position control along teaching for each of the motors M1 through M6. This is described below.

The revolving of rotating electrode 32 of the end effector 30 as mentioned above is made as a center at the point in contact with the object 61 (specifically, point TP), which is as a center of revolution. Namely, the robot control unit 44 causes a motor M6 to rotate and thus to rotate the end effector 30 around the sixth axis 28. As a result, the revolution of rotating electrode 32 is made as a center at a point TP in contact with the object 61.

Thereby, the robot control device 70 allows the end effector 30 to revolve while performing the seam welding. Therefore, even if the rotating electrode 32 of the end effector 30 deviates from the target position 132, the robot control device 70 allows the rotating electrode 32 to bring back to the target position 132 while performing the welding, appropriately.

Subsequent to adding the correction angle θa to positional instruction value of the robot 20 that has been set in advance, the inverse kinematics operation is performed, and then operation positional instruction signal for each of the first motor M1 through the sixth motor is transmitted. However, it is not limited thereto. Namely, for example, the end effector 30 may be adapted to the robot 20 such that the sixth axis 28 overlaps an Rz-axis, so that it is possible to change the correction angle θa by merely correcting the operating position of the sixth axis 28.

Figure 16:
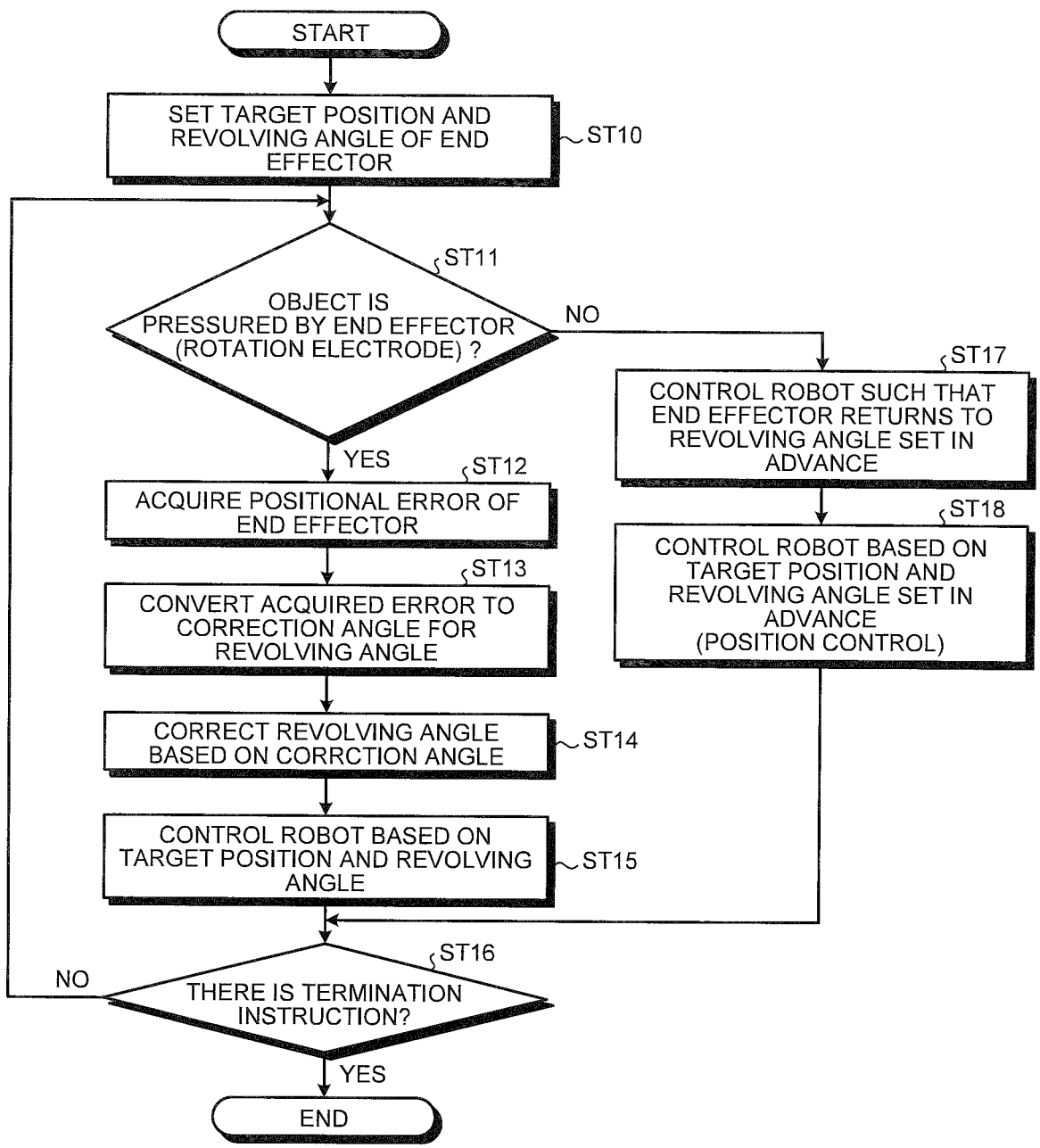
FIG. 16 is a flowchart showing a procedure performed by the robot control device.

Subsequently, processing steps performed by the above mentioned robot control device 70 are described with reference to FIG. 16. FIG. 16 is a flowchart showing the process flow.

As shown in FIG. 16, first, the target position and revolving angle setting unit 71 of the robot control device 70 sets the target position 132 of the end effector 30 and revolving angle thereof (ST10). Subsequently, the pressure determining unit 72 determines whether the end effector 30, exactly the rotating electrodes 31 and 32, pressurizes the object 61 (ST11).

If the pressure determining unit 72 determines that the rotating electrodes 31 and 32 pressurize the object 61 (YES at ST11), the error acquiring unit 73 acquires an error A at the position of the end effector 30 (ST12). subsequently, the converter 74 converts the error A to the correction angle θa for revolution angle using the above mentioned formula (1) (ST13).

Subsequently, the inverse kinematics calculating unit 75 corrects the revolution angle that has been set by the target position and revolving angle setting unit 71 based on the correction angle θa obtained by the converter 74 (ST14). Specifically, the inverse kinematics calculating unit 75 corrects the revolution angle by adding a correction angle θa to a revolving angle that has been set in advance. Then, the inverse kinematics calculating unit 75 generates operation positional instruction signal for each of motor M1 through M6 by performing the inverse kinematics operation for the corrected values (corrected instructions).

Then, the robot control unit 44 controls the robot 20 based on the corrected target position and revolving angle (ST15). Specifically, the robot control unit 44 controls the robot 20 so as to operate each of the motors M1 through M6 based on the above mentioned operation positional instruction signal.

In this way, if the pressure determining unit 72 determines that the rotating electrodes 31 and 32 pressurize the object 61, the robot control unit 44 controls the robot 20 such that the end effector 30 revolves based on the correction angle θa. Thereby, even if the end effector 30 deviates from the target position 132 under the pressurized condition, the robot control device 70 allows the end effector 30 to bring back to the target position 132, appropriately.

In addition, if the error A is not present, the correction angle θa obtained through the process at step ST13 comes into zero. Accordingly, at step ST14, the revolving angle that has been set in advance is not substantially corrected. Therefore, at step ST15, the robot control unit 44 controls the robot 20 based on the target position and revolving angle of the end effector 30 that has been set by the target position and revolving angle setting unit 71, that is, based on the target position and revolving angle of the end effector 30 that has been taught.

After the process at step ST15, the robot control unit 44 determines whether termination instruction is present (ST16). If the robot control unit 44 determines that termination instruction is present (YES at a step ST16), a sequence of seam welding process ends. On the other hand, if the robot control unit 44 determines that termination instruction is not present (NO at a step ST16), process returns to the step ST11 and the above mentioned processes are repeated.

In this way, the robot control device 70 allows for a feedback control in which the position of the rotating electrode 32 is compared to the target position 132 any time while performing seam welding. If the correction angle θa is calculated by PI control, a value of a PI integrator being not shown may be cleared or reset at any timing appropriately as necessary.

On the other hand, if the pressure determining unit 72 determines that the rotating electrodes 31 and 32 do not pressurize the object 61 (NO at a step of ST11), the robot control unit 44 controls the robot 20 such that the end effector 30 is brought back to the revolving angle that has been set in advance (ST17).

Namely, if the pressure determining unit 72 determines that the rotating electrodes 31 and 32 do not pressurize the object 61, it is possible to estimate that the end effector 30 does not perform the seam welding. In such a case, if the end effector 30 remains at corrected revolving angle, upon moving to next molding position, the end effector 30 does not appropriately lie on the estimated line 64 and thus seam welding along the estimated line 64 might be impossible.

Therefore, if no pressure state is determined, the robot control device 70 according to the present embodiment returns the end effector 30 to the predetermined revolving angle, without revolving the end effector 30 based on the correction angle θa.

Thereby, for example, when the end effector 30 moves to next welding point, because the end effector 30 is at a revolving angle that has been set in advance, the end effector 30 appropriately lies on the estimated line 64 and thus it is possible to perform the seam welding along the estimated line 64.

Subsequently, the robot control unit 44 performs a position control for driving sections (motors M1 through M6) based on the target position 132 and the revolving angle of the end effector 30 that has been set in advance, specifically based on the target position 132 and the revolving angle of the end effector 30 that has been taught, so as to control the robot 20 (ST18).

In this way, if the pressure determining unit 72 determines the condition as being pressurized, the robot control unit 44 performs a positional control based on teaching and the correction angle θa for the driving sections M1 to M6 and thus controls the robot 20. On the other hand, if the pressure determining unit 72 determines the condition as being not pressurized, the robot control unit 44 performs a normal positional control based on teaching for the driving sections M1 to M6 and thus controls the robot 20. Namely, based on determination whether the condition is as being pressurized or not, the controls of the robot 20 can be switched.

Thereby, during seam welding, while correcting displacement between the actual position of the end effector 30 and the target position 132, it is possible to perform a control of the end effector 30 such that movement that has been taught is replayed. On the other hand, during not seam welding, it is possible to perform a control of the end effector 30 such that movement that has been taught is exactly replayed.

In the embodiment above mentioned, at step ST17 the end effector 30 is returned to revolving angle that has been set in advance, and then at step ST18, position control for the drive sections M1 to M6 of the robot 20 is performed. However, it is not limited thereto. Both steps ST17 and ST18 may be processed in parallel. Furthermore, the robot control unit 44 proceeds to the step ST16 after the step ST18 to perform the process above mentioned.

As mentioned above, the robot control device 70 according to the present embodiment includes the error acquiring unit 73, the converter 74, and the robot control unit 44. The error acquiring unit 73 acquires an error A between the measured or estimated position of each of the end effector 30 adapted to the plurality of drive sections M1 to M6 and the target position 132 of the end effector 30. The converter 74 converts the error A to a correction angle θa for a revolving angle of the end effector 30 that has been set in advance. The robot control unit 44 controls the robot 20 such that the end effector 30 revolves based on the correction angle θa. Thereby, even if the end effector 30 deviates from the target position 132, the robot control device 70 is capable of controlling an operation of the robot 20 so as to bring it back to the target position 132, appropriately.

In the embodiment described above, it has been described that the end effector 30 is as the welding device 30, and the roller part 320 is as the rotating electrodes 31 and 32. However, it is not limited thereto. Namely, the end effector 30 may be such a device that moves depending to rotation of the roller part 320 while being in contact with the object 61. For example, the end effector 30 may be a crimping device that moves wile crimping a metal foil over the object 61. In this way, the end effector 30 and the roller part 320 may be appropriately modified depending upon process content performed by the end effector 30.

Furthermore, in the embodiment above, although the target position and revolving angle setting unit 71, the pressure determining unit 72, the robot control unit 44, and the like are incorporated in the robot control device 70, a part or whole thereof may be configured separately.

Furthermore, in the embodiment above, although the robot 20 is configured as a type of six axes, it is not limited thereto. Namely, the robot 20 other than the type of six axes may be employed, for example, a type of less five axes or a type of more seven axes may be employed. Furthermore, another kind of robot such as a dual arms robot may be employed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A seam welding apparatus that performs seam welding on layered steel plates, the seam welding apparatus comprising:
   an articulated robot capable of setting a predetermined tolerance for a joint; and
   a welding device attached to the robot and revolvable about a revolving axis of the robot,
   the welding device comprising:
      a pair of rotation electrodes for seam-welding the layered steel plates while applying pressure, the pair of rotation electrodes being rotatably supported by the welding device about respective rotation axes orthogonal to the revolving axis;
      an electrode supporting frame that supports the rotating electrodes;
      an optical distance measuring device provided on the electrode supporting frame, the optical distance measuring device including:
         a laser emission part disposed to face an edge of one of the layered steel plates, the laser emission part being configured to emit light toward the edge;
         a light position detecting device configured to receive the light emitted from the laser emission part that reflects from the edge so as to detect a position of the received light reflected from the edge, the light position detecting device comprising a plurality of light receiving elements that are arranged in a row in an extending direction of the edge and receive different reflected lights corresponding to positions at which the light reflects from the edge of one of the layered steel plates;
         a light projecting lens; and
         a light receiving lens,
      wherein the laser emission part, the light position detecting device, the light projecting lens, and the light receiving lens are provided at fixed positional relationships with respect to each other, and
      the optical distance measuring device is configured to geometrically measure, based on which light receiving element of the plurality of light receiving elements of the light position detecting device receives the different reflected lights, a distance from the optical distance measuring device to the edge in a direction parallel to the rotation axes of the pair of rotation electrodes; and
   a controller configured to:
      set a target position of the welding device to set a target distance from the optical distance measuring device to the edge when the welding device is in the target position;
      calculate a deviation of the distance measured by the optical distance measuring device from the target distance while the pair of rotation electrodes is running on the layered steel plates to perform seam welding; and
      control the robot to adjust a running direction of the rotation electrodes so that the deviation comes into zero when a distance actually measured by the optical distance measuring device deviates from the target distance.

2. A seam welding apparatus that performs seam welding on layered steel plates, the seam welding apparatus comprising:
   an articulated robot capable of setting a predetermined tolerance for a joint; and
   a welding device attached to the robot and revolvable about a revolving axis of the robot,
   the welding device comprising:
      a pair of rotation electrodes for seam-welding the layered steel plates while applying pressure, the pair of rotation electrodes being rotatably supported by the welding device about respective rotation axes orthogonal to the revolving axis;
      an electrode supporting frame that supports the rotating electrodes;
      a supporting frame that rotatably supports the electrode supporting frame so that it is possible to change a direction of running when the rotating electrodes run on the steel plates;
      a revolving means configured to revolve the electrode supporting frame provided on the supporting frame;
      an optical distance measuring device provided on the supporting frame or the electrode supporting frame, the optical distance measuring device including:
         a laser emission part disposed to face an edge of one of the layered steel plates, the laser emission part being configured to emit light toward the edge;
         a light position detecting device configured to receive the light emitted from the laser emission part that reflects from the edge so as to detect a position of the received light reflected from the edge, the light position detecting device comprising a plurality of light receiving elements that are arranged in a row in an extending direction of the edge and receive different reflected lights corresponding to positions at which the light reflects from the edge of one of the layered steel plates;
         a light projecting lens; and
         a light receiving lens,
      wherein the laser emission part, the light position detecting device, the light projecting lens, and the light receiving lens are provided at fixed positional relationships with respect to each other, and the optical distance measuring device is configured to geometrically measure, based on which light receiving element of the plurality of light receiving elements of the light position detecting device receives the different reflected lights, a distance from the optical distance measuring device to the edge in a direction parallel to the rotation axes of the pair of rotation electrodes; and a controller configured to:
  set a target position of the welding device to set a target distance from the optical distance measuring device to the edge when the welding device is in the target position;
  calculate a deviation of the distance measured by the optical distance measuring device from the target distance while the pair of rotation electrodes is running on the layered steel plates to perform seam welding; and
  control the revolving means to adjust a running direction of the rotation electrodes so that the deviation comes into zero when a distance actually measured by the optical distance measuring device deviates from the target distance.

3. A method of performing seam welding by using a seam welding apparatus according to claim 1, the method comprising:
  teaching a welding line to the articulated robot;
  setting the predetermined tolerance for the joint of the articulated robot;
  setting the target distance in the controller;
  measuring a distance to the edge of the steel plate by the optical distance measuring device when performing the seam welding;
  calculating, by the controller, the deviation between a distance actually measured and the target distance; and
  controlling, by the controller, the robot to adjust the running direction of the rotation electrodes so that the deviation comes into zero.

4. A robot control system comprising:
a processor;
a robot having an end effector revolvable about a revolving axis of the robot, the end effector including a pair of rotation electrodes for seam-welding two overlapped steel plates while applying pressure, the pair of rotation electrodes being rotatably supported by the end effector about respective rotation axes orthogonal to the revolving axis; and
an optical measuring device that is provided on the end effector,
  the optical measuring device including:
    a laser emission part disposed to face an edge of one of the two overlapped steel plates, the laser emission part being configured to emit light toward the edge;
    a light position detecting device configured to receive the light emitted from the laser emission part that reflects from the edge so as to detect a position of the received light reflected from the edge, the light position detecting device comprising a plurality of light receiving elements that are arranged in a row in an extending direction of the edge and receive different reflected lights corresponding to positions at which the light reflects from the edge of one of the two overlapped steel plates;
    a light projecting lens; and
    a light receiving lens,
      wherein the laser emission part, the light position detecting device, the light projecting lens, and the light receiving lens are provided at fixed positional relationships with respect to each other, and
    the optical measuring device is configured to geometrically measure, based on which light receiving element of the plurality of light receiving elements of the light position detecting device receives the different reflected lights, a distance from the optical measuring device to the edge in a direction parallel to the rotation axes of the pair of rotation electrodes,
wherein the processor is configured to:
  set a target position of the end effector to set a target distance from the optical measuring device to the edge when the end effector is in the target position;
  calculate an error of the distance measured by the optical measuring device from the target distance while the pair of rotation electrodes is running on the two overlapped steel plates to perform seam welding; and
  rotate the end effector about the revolving axis of the robot so as to adjust a running direction of the pair of rotation electrodes so that the error comes into zero.

5. The robot control system according to claim 4, wherein
a rotation electrode of the pair of rotation electrodes is moved by a cylinder to pressure the overlapped steel plates,
the processor is further configured to:
  send a pressurizing instruction to the cylinder to cause the pair of rotation electrodes to pressure the overlapped steel plates;
  determine, based on whether or not the pressurizing instruction was sent to the cylinder, whether or not the pair of rotation electrodes pressures the overlapped steel plates; and
  when the pressurizing instruction is determined to have been sent, rotate the end effector about the revolving axis of the robot so as to adjust the running direction of the pair of rotation electrodes so that the error comes into zero.

6. The robot control system according to claim 5, wherein the end effector includes a support frame that pivotally supports an electrode supporting frame that support the pair of rotation electrodes, the support frame pivotally supports the electrode supporting frame about a rotational axis, the rotational axis passes through centers of the pair of rotation electrodes.

7. The robot control system according to claim 5, wherein the processor is further configured to perform, when determining that the pair of rotation electrodes does not pressure the overlapped steel plates based on an absence of the pressurizing instruction, positional control on drive sections of the robot without rotating the end effector about the revolving axis of the robot so as to adjust the running direction of the pair of rotation electrodes so that the error comes into zero.

8. The robot control system according to claim 7, wherein the processor is further configured to perform, when determining that the pair of rotation electrodes does not pressure the overlapped steel plates based on the absence of the pressurizing instruction, positional control on the drive sections of the robot after returning the end effector to a predetermined revolving angle.

9. A robot control method using the robot control system according to claim 4, the method comprising:
- calculating the error of the distance measured by the optical measuring device from the target distance while the pair of rotation electrodes is running on the two overlapped steel plates to perform seam welding;
- converting the error to a correction angle for a predetermined revolving angle of the end effector; and controlling the robot so that the end effector revolves based on the correction angle so that the error comes into zero.

10. The robot control system according to claim 7, wherein
- the processor is further configured to perform the positional control in a state where the pair of rotation electrodes is in contact with the overlapped steel plates even when the processor determines that the pair of rotation electrodes does not pressure the overlapped steel plates.

11. The robot control system according to claim 4, wherein
- the robot is a multi joint robot having a plurality of joints having a range of tolerance for the plurality of joints, and
- the processor is configured to adjust the running direction of the pair of rotation electrodes within the range of tolerance for the plurality of joints.

* * * * *